United States Patent
Huang et al.

(10) Patent No.: US 7,362,803 B2
(45) Date of Patent: Apr. 22, 2008

(54) METHOD AND SYSTEM FOR INTERACTIVE CHANNEL EQUALIZATION

(75) Inventors: Xiaojing Huang, North Ride (AU); Darryn Lowe, Helensburgh (AU)

(73) Assignee: Motorola, Inc., Schaumburg, IL (US)

( * ) Notice: Subject to any disclaimer, the term of this patent is extended or adjusted under 35 U.S.C. 154(b) by 735 days.

(21) Appl. No.: 10/903,353

(22) Filed: Jul. 30, 2004

(65) Prior Publication Data

US 2006/0023806 A1 Feb. 2, 2006

(51) Int. Cl.
*H03H 7/30* (2006.01)
*H03H 7/40* (2006.01)
*H03K 5/159* (2006.01)

(52) U.S. Cl. ............ 375/232; 375/231; 375/296; 375/285

(58) Field of Classification Search ............ 375/285, 375/278, 229, 232, 231, 296, 346, 348, 350; 455/63.1, 114.2, 296
See application file for complete search history.

(56) References Cited

U.S. PATENT DOCUMENTS 6,219,378 B1 * 4/2001 Wu .................. 375/231
6,252,914 B1 * 6/2001 Yamamoto ............. 375/296
6,336,041 B1 * 1/2002 Vatalaro et al. .......... 455/561
6,516,025 B1 * 2/2003 Warke et al. ........... 375/222

* cited by examiner

*Primary Examiner*—Phuong Phu

(57) ABSTRACT

A method and system for interactive channel equalization uses channel status information included in data packets. The system includes a first station adapted to transmit a first data packet including a channel status information segment over a radio communication channel as a first signal. A second station in the system includes a static pre-equalizer and an adaptive equalizer. The second station is adapted to receive the first signal and adaptively equalize the first signal using the adaptive equalizer and the channel status information to create a post hoc status estimate of the channel. The second station is further adapted to transmit a second data packet over the channel as a second signal, where the second signal is pre-equalized by the pre-equalizer using the post hoc status estimate of the channel. The method and system thus enable parameters of the channel equalization to be adjusted in real-time in response to varying channel conditions.

22 Claims, 4 Drawing Sheets

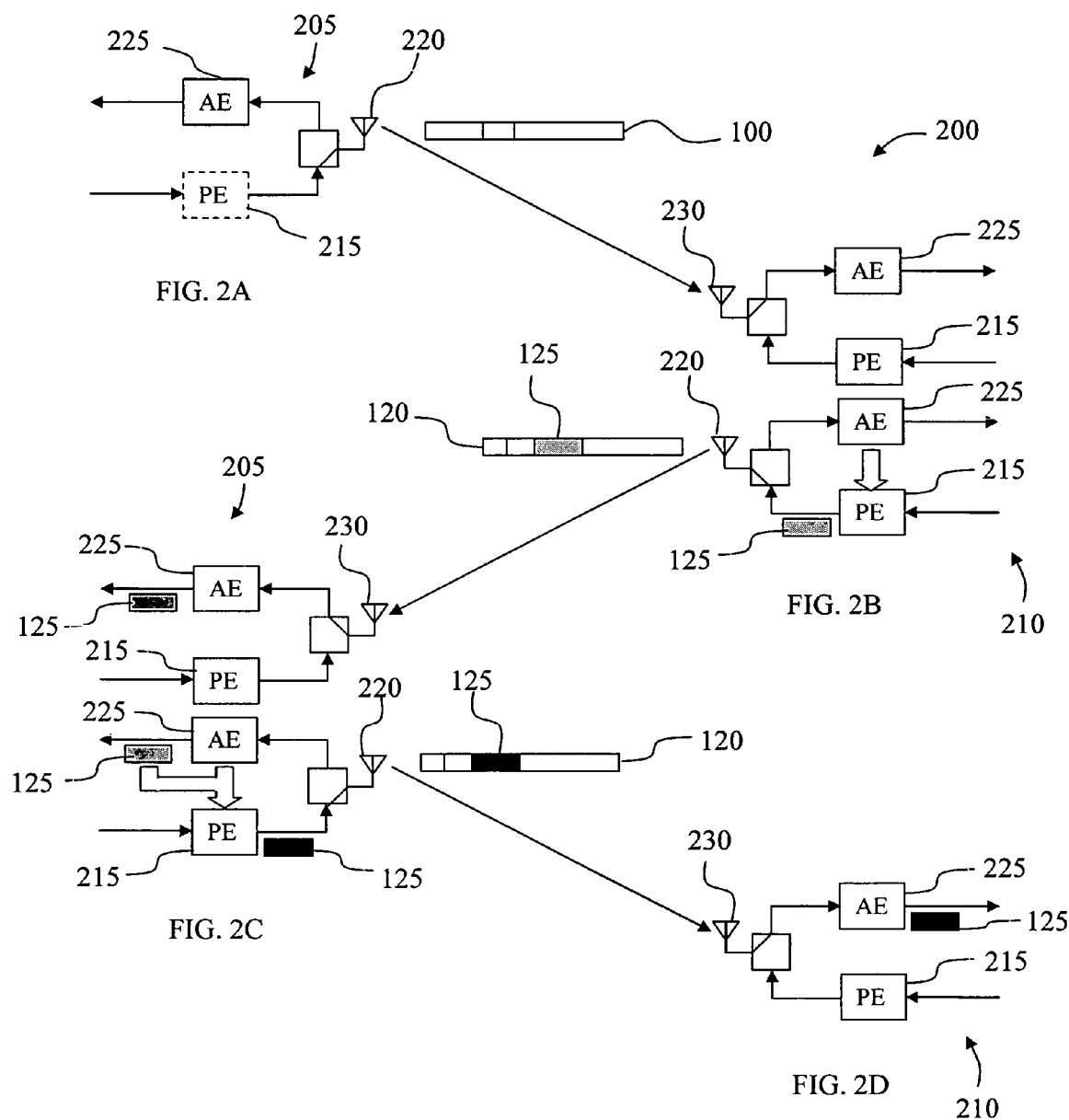

METHOD AND SYSTEM FOR INTERACTIVE CHANNEL EQUALIZATION

FIELD OF THE INVENTION

The present invention relates generally to a method and system for communication channel equalization, and in particular to wireless communication channel equalization using stored channel status information.

BACKGROUND OF THE INVENTION

Future generation wireless local area networks (WLANs) will be required to provide higher capacity and link speed as well as greater reliability, mobility and adaptivity—even in the presence of severe channel conditions such as multipath distortion and frequency-selective fading. The nature of such severe channel conditions and some existing techniques that attempt to overcome such conditions are summarized below.

Wireless radio communication generally requires a transmitter that modulates data onto radio carrier waves and that transmits the carrier waves to a receiver. The receiver then detects the carrier waves and recovers the data. Often the communications are sent digitally such that the modulated data consists of individual data symbols. To be meaningful, the individual symbols must be synchronized at the receiver to correspond with the temporal data synchronization at the transmitter.

In terrestrial radio broadcasting, wireless systems need to address multipath channels from reflected carrier waves that distort the temporal reception of digital data. For example, transmitted radio waves may reflect off of buildings, mountains and airplanes such that the same signal arrives at a receiver from various paths having different lengths. The different path lengths cause phase differences such that the reflected versions of the signal interfere with each other, an effect known as inter-symbol interference (ISI). ISI can result in severe multipath distortion of the received signal when individual data bits on a carrier wave are transmitted over a time interval T that is significantly less than the delay τ-max between the longest reflected path and the most direct path between a transmitter and a receiver (such that τ-max/T>>1).

The problem of frequency-selective fading is often a result of multipath distortions. An aspect of frequency selective fading is that some frequencies are enhanced while other frequencies are attenuated.

Various techniques have been developed to mitigate the effects of multipath signal distortion and frequency-selective fading. One technique is multiple carrier code division multiple access (MC-CDMA) that is a modulation technique that divides a digital data signal having a high bit rate into numerous parallel bit streams or sub-carriers, each having a much lower bit rate. The lower bit rate results in τ-max/T<1, thus greatly reducing ISI. MC-CDMA uses transmission bandwidth efficiently by densely spacing the sub-carriers in an overlapping, orthogonal arrangement.

However, disadvantages of MC-CDMA techniques include the fact that the lower bit rate requires more sub-carriers, which in turn requires more complex Fast Fourier Transform (FFT) processing steps, which leads to reduced capacity. Complex FFT processing increases system latency and also requires data to be organized in long blocks that add to system overhead.

Other methods for minimizing the effects of multipath distortion include the use of antenna spatial diversity. These methods generally involve a plurality of transmitting antennas in different locations. A receiver then receives multiple signals from the different antennas and calculates multiple transmission paths between the transmitters and the receiver. The signal to noise ratio is then increased by combining the multiple transmission paths coherently. However, disadvantages of these techniques include the fact that each transmitter must be able to transmit with enough power to obtain a minimum signal to noise ratio at the receiver. That is problematic when transmissions occur across a wide area. Also, antenna spatial diversity techniques obviously require additional transmitter and/or receiver equipment.

Multipath distortion also can be minimized through the use of direct, point-to-point transmissions using a narrow transmission beam. But point-to-point transmissions are generally not practical in mobile device applications, particularly in mobile device applications in urban areas where successful signal reception often depends on multiple signal reflections.

Still other techniques to minimize the effects of multipath distortion include adaptive channel equalization techniques and pre-equalization techniques. Adaptive channel equalization techniques can be implemented at a receiver and are useful tools to reduce ISI caused by frequency-selective fading channels in wireless systems. The receiver estimates the nature of an actual signal by subtracting delayed, multipath signals. However, when a transmitted data rate is high and a channel delay spread is long, conventional receiver-based adaptive equalizers become complicated and a system's performance degrades due to imperfect channel estimation and noise amplification.

Recently, pre-equalization techniques, implemented at the transmitter, have been studied as an alternative way to combat frequency-selective fading channels. A brief description of these techniques is given as follows: According to the Lorentz Reciprocity Theorem, the reflections off materials of electromagnetic waves travelling between two points generally demonstrate reciprocity. That is, channel characteristics are equally distorted by waves travelling in either direction. Pre-equalization techniques are therefore used to estimate the distortion of a future signal transmission by first estimating the distortion of a received signal.

Using pre-equalization techniques, a channel condition is estimated at the time of reception of a multipath signal transmitted from a first station. A second station that receives the distorted signal first estimates the actual signal and the multipath components. When the second station next transmits a signal back across the same channel to the first station, the second station pre-equalizes the signal so that the multipath condition at the first station results in the cancellation of the multipath signals, leaving only the desired signal.

Pre-equalization techniques that use static, pre-determined channel measurements have been in use for many years. One example is in twisted-pair Ethernet systems at 100 Mbps and above. However, because of the requirement for a-priori channel measurements, static pre-equalization has been practical only in wired systems and in wireless systems that experience only very slowly fading channels, such as with stations in fixed locations that are nearby and without significant atmospheric or electromagnetic interference.

To summarize, assume that a channel pre-equalization system includes a feedback channel and that the channel fading is very slow. In a time division duplex (TDD) system, Channel Status Information (CSI) for a communication channel between a receiver and a transmitter can be estimated at the receiver. Then, the same CSI can be used to estimate the channel condition from the receiver to the transmitter due to channel reciprocity. For other duplex systems, such as frequency division duplex (FDD) system, the CSI can be estimated at the receiver side and then communicated via an explicit feedback channel. After the CSI is estimated, the signal to be transmitted can be pre-distorted by a pre-equalizer at the transmitter. The pre-distorted signal then travels through the channel such that a compensated signal is received at the receiver. Therefore, by virtue of the pre-equalization, there will be no net ISI caused by the channel and no need for equalization at the receiver.

However, since the pre-equalizer is a quasi-static filter (i.e., the coefficients are fixed for the duration of a single transmission), any change in the channel characteristics will not be compensated for, and, as a result, ISI will not be eliminated completely. It is possible in some circumstances to reduce this residual ISI by using previous CSI to predict future channel states. However, since practical channels are never entirely deterministic, a prediction error will inevitably degrade the performance of the pre-equalization process.

An improved method of signal pre-equalization is therefore needed that eliminates many of the disadvantages of the above-described prior art.

SUMMARY OF THE INVENTION

According to one aspect, the present invention is therefore an improved method of pre-equalizing radio communication signals. The method involves including first channel status information in a segment of a first data packet. The first data packet is then transmitted from a first station over a radio communication channel as a first signal, where the first signal is pre-equalized at the first station using the first channel status information. Next, the first signal is received at a second station, where the first signal is adaptively equalized using the first channel status information to create a first post hoc status estimate of the channel. Second channel status information is then included in a segment of a second data packet, where the second channel status information is calculated from the first post hoc status estimate of the channel. The second data packet is then transmitted over the channel from the second station as a second signal, where the second signal is pre-equalized at the second station using the second channel status information.

According to another aspect, the present invention is a system for pre-equalizing radio communication signals. The system includes a first station adapted to transmit a first data packet including a channel status information segment over a radio communication channel as a first signal. A second station in the system includes a static pre-equalizer and an adaptive equalizer. The second station is configured to receive the first signal and adaptively equalize the first signal using the adaptive equalizer and the channel status information to create a post hoc status estimate of the channel. The second station is further configured to transmit a second data packet over the channel as a second signal, where the second signal is pre-equalized by the pre-equalizer using the post hoc status estimate of the channel.

BRIEF DESCRIPTION OF THE DRAWINGS

In order that the invention may be readily understood and put into practical effect, reference will now be made to a preferred embodiment as illustrated with reference to the accompanying drawings, wherein like reference numbers refer to like elements, in which:

FIGS. 2A-2D are schematic diagrams illustrating the operation of an interactive channel equalization system according to an embodiment of the present invention;

DETAILED DESCRIPTION OF THE PREFERRED EMBODIMENTS

In a preferred embodiment, the present invention is therefore an interactive equalization technique for WLANs. WLAN protocols such as those based on the IEEE 802.11 standards are designed to recreate the high Quality of Service (QoS) that is typically supplied in wired networks that use standard LAN protocols such as Ethernet. High QoS includes uninterrupted network connections, high throughput and reliable delivery of data. However maintaining such high QoS in a WLAN is more difficult than in a wired network because of issues such as multipath distortion as described above.

The IEEE 802.11 standards concern the operation of a network's Media Access Control (MAC) layer. The MAC layer resides just above a network's Physical (PHY) layer and is responsible for controlling access to the wireless channel. The MAC receives MAC Service Data Units (MSDUs) from the higher layers. MSDU's may be fragmented into smaller MAC Protocol Data Units (MPDUs), which are then transported between network stations across the wireless medium. Network stations are devices connected to the network that may be mobile, portable, or stationary. MPDUs are transmitted between network stations using a carrier sense multiple access with collision avoidance (CSMA/CA) protocol. Collision detection such as that used in the Ethernet protocol cannot be used in wireless transmissions, because when a wireless station is transmitting it cannot hear other stations on the network as its own signal will interfere with any received signal. The IEEE 802.11 standards refer to the above method of channel access as the Distributed Coordination Function (DCF).

The 802.11 standards also describe a second channel access method for networks where an Access Point (AP) is present. This method, referred to as the Point Coordination Function (PCF), uses polling to provide access to the wireless medium. The AP constructs a polling list that determines the order in which the stations within the network will be polled.

In an IEEE 802.11 network, stations are collected into a Basic Service Set (BSS). A BSS may comprise an ad hoc network where all stations in the network can communicate directly with all other stations. Alternatively a BSS may include an AP in which case it is called an infrastructure BSS. In an infrastructure BSS, all stations communicate exclusively through the AP. The AP is often connected to a wired LAN and therefore can significantly increase the range and resources available to a BSS. Because all stations in a BSS share the same media, any communicating station pair can be viewed as a TDD system, making signal pre-equalization techniques readily employable.

Figure 1A:
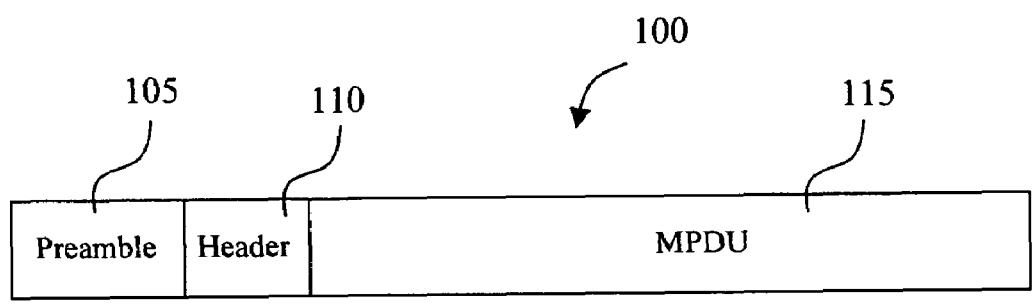
FIG. 1A illustrates the components of a data packet that is transferred between stations in a BSS according to the prior art.

The present invention is therefore a method and system that combines features of signal pre-equalization and adaptive channel estimation together to create interactive channel equalization. Referring to FIG. 1A there is illustrated the components of a data packet 100 that is transferred between stations in a BSS according to the prior art. In existing WLAN protocols, such as IEEE 802.11/b/g, the data packets 100 that are transferred between stations consist of a preamble 105, a header 110 and an MPDU 115. The preamble 105 is used to signal to a receiver that data will follow using a start-of-frame delimiter. The preamble 105, also known as a Physical Layer Convergence Protocol (PLCP) preamble, generally consists of 18 bytes of memory. The 802.11b standard also provides an option for reducing the size of the preamble 105 to nine bytes, in which case it is known as a "short preamble". Next, the header 110, also known as a PLCP header, generally consists of 6 bytes of memory and different formats of the header 110 are used depending on whether a long or a short preamble 105 is used. The header 110 includes signal, service, length and frame check sequence information.

Figure 1B:
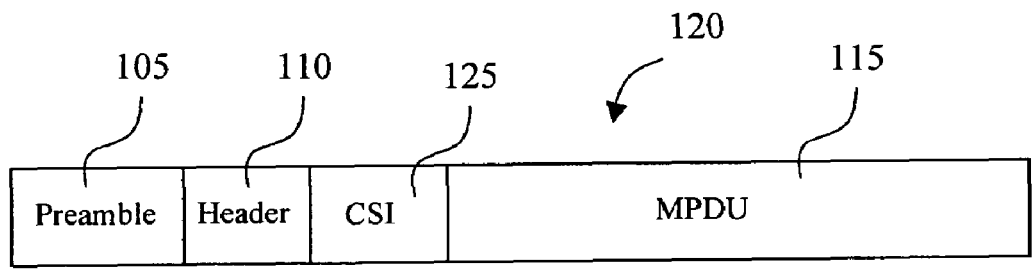
FIG. 1B illustrates the components of an interactive equalization data packet that is transferred between stations in a BSS according to one embodiment of the present invention.

Referring to FIG. 1B there is illustrated the components of interactive equalization data packets 120 that are transferred between stations in a BSS according to one embodiment of the present invention. In addition to the preamble 105 and header 110, the interactive equalization data packets 120 of the present invention include a Channel Status Information (CSI) segment 125 before the MPDU 115. Further, to make an embodiment of the present invention compatible with existing WLAN protocols, the header 110 is modified so that one bit in the header is used to flag the presence of the CSI segment 125. That preserves backwards compatibility across standards, because if the additional header bit is set, then a receiving station will know that a CSI segment 125 has been added to the data packet 120; if the additional header bit is not set, then a receiving station will known that no CSI segment 125 has been added and data is being sent in a prior art standard data packet 100. Further, each CSI segment 125 is time stamped so that it is easy to determine whether the channel information in any particular CSI segment 125 is current.

Next, referring to FIGS. 2A-2D, there is are schematic diagrams illustrating the operation of an interactive channel equalization system 200 according to an embodiment of the present invention. The system 200 includes a first station 205 and a second station 210. Both stations 205, 210 are generally part of the same BSS. Further, both stations 205, 210 store in a local memory a most recently received CSI segment 125, or a modification of a CSI segment 125 called a post hoc channel estimate, from all other stations in the BSS. That enables each station to have immediate access to an estimate of the channel conditions between itself and each other station in the BSS.

In both stations 205, 210 a static pre-equalizer 215 is operatively connected to a transmitter 220 and an adaptive equalizer 225 is operatively connected to a receiver 230. Referring to FIGS. 2A and 2B, if the first station 205 needs to transmit a data packet 100 to the second station 210, the first station 205 will first check to see whether it has saved in memory a CSI segment 125 from the second station 210. If so, it will check the time stamp of the CSI segment 125 that it has saved from the second station 210. If the time stamp has expired, or if no CSI segment 125 from the second station 210 exists in the memory of the first station 205, then the first station 205 will de-activate its pre-equalizer 215 (such de-activation indicated by the dashed lines in FIG. 2A) and transmit the data packet without a CSI segment 125.

The second station 210 then receives the data packet and uses its adaptive equalizer 225 to estimate the condition of the channel between the two stations 205, 210. The output of the adaptive equalizer 225 is a post hoc status estimate of the channel. It is called a post hoc estimate because the estimate is formulated based on the actual condition of the channel as measured by the adaptive equalizer 225 using the immediately preceding received signal. The second station 210 then stores the post hoc channel estimate.

Next, referring to FIGS. 2B and 2C, when the second station 210 needs to transmit data back to the first station 205, the second station 210 creates a new CSI segment 125 for including in a data packet 120 that is then sent to the first station 205. The new CSI segment 125 is based on the post hoc channel estimate for the first station 205 that the second station 210 had stored previously.

When the first station 205 receives the new data packet 120 from the second station 210, the first station 205 uses its adaptive equalizer 225 to compensate for any difference between the actual channel condition and the channel condition defined by the received CSI segment 125 in the newly received data packet 120 from the second station 210.

For channels with a coherence time that is much greater than the time between transmissions of data packets 120, the adaptive equalizers 225 in the receiving stations 205, 210 will need to make only minor corrections to the received signals because the pre-equalizers 215 in the sending stations 205, 210 will have preemptively performed most of any necessary signal corrections.

The CSI segment 125 that is received by the first station 205 in FIG. 2C, will also be modified to include any adjustments made by the adaptive equalizer 225 of the first station 205. The modified CSI segment 125 is then stored as a post hoc status estimate of the channel or as a new CSI segment 125 including a new time stamp. The channel status information and the time stamps may be stored on any form of computer readable medium. The stations 205, 210 then include a computer readable program code device for reading the stored information.

If the first station 205 needs to send another data packet 120 back to the second station 210 across the same channel, and the CSI segment 125 for that channel at the first station 205 has not expired, the outgoing data packet 120 will contain, and be pre-equalized using, that CSI segment 125. Referring to FIG. 2D, when the second station 210 receives the data packet 120, the second station 210 will also use its adaptive equalizer 225 to update its own post hoc status estimate of the channel.

There are many methods by which traditional adaptive post-equalizers are implemented. One common example is a gradient descent technique whereby a receiver learns the status of a channel by iteratively refining an impulse response into an approximation of channel coefficients.

The interactive equalization defined by the present invention is an improvement on the gradient descent technique. Although a learning algorithm is still used, the learning algorithm needs to only fine-tune existing channel status information—as opposed to repeatedly estimating a channel status with no prior knowledge of the channel status. Therefore, the learning process of the system and method of the present invention requires less iteration to achieve a satisfactory estimate of channel status, is less computationally expensive, and is less sensitive to errors. The present invention can therefore improve almost any type of wireless digital device including mobile telephones, personal digital assistants, laptop computers, desktop computers, printers, and other computer peripheral devices.

A further improvement of the present invention over traditional adaptive post-equalization is that a station 205, 210 retains channel status information between transmissions. That is distinguished from prior art adaptive equalization systems where each data packet is equalized without the benefit of supplementary information concerning the recent condition of a channel.

Figure 3:
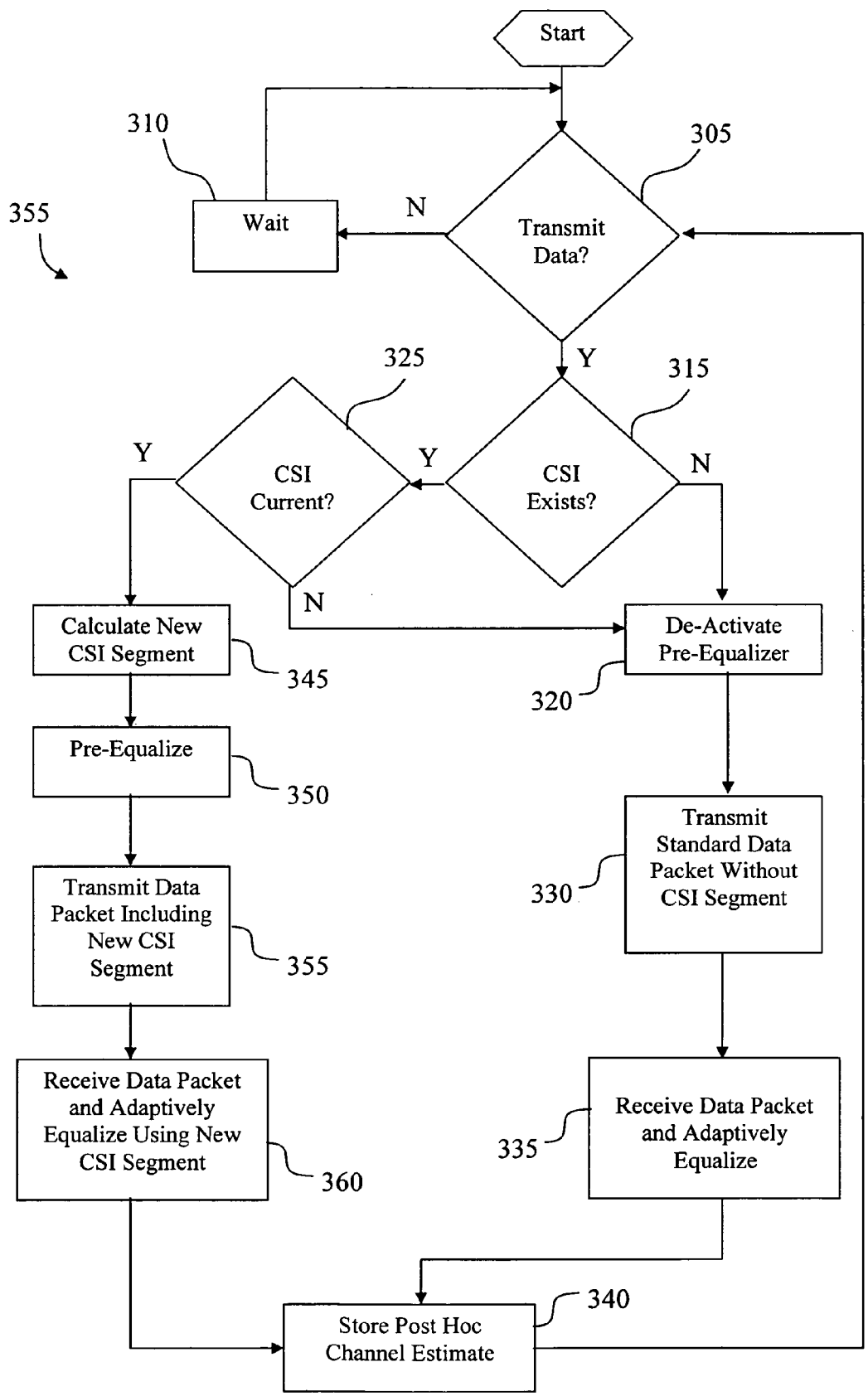
FIG. 3 is a generalized flow diagram illustrating a method for implementing interactive equalization according to one embodiment of the present invention.

Referring to FIG. 3, there is a generalized flow diagram illustrating a method 300 for implementing interactive equalization as described above, according to an embodiment of the present invention. The method 300 begins at step 305 where a first station 205 is polled to determine whether it has queued data waiting to be transmitted. If not, the station 205 waits at step 310 for a subsequent poll. If however at step 305 the station 205 is ready to transmit data then the method 300 continues at step 315 where the station 205 determines whether channel status information is stored for a designated second station 210 that will receive the queued data. If no channel status information concerning the condition of a channel between the first station 205 and the receiving second station 210 is stored, then the method 300 continues at step 320 where the pre-equalizer 215 in the first station 205 is de-activated. However, if at step 315 it is determined that channel status information for the second station 210 is stored at the first station 205, then at step 325 it is determined whether a time stamp on that channel status information is current. If the time stamp is not current, the method 300 again returns to step 320.

After the pre-equalizer 215 of the first station 205 is de-activated, at step 330 the first station 205 transmits a standard data packet 100, without a CSI segment 125, to the second station 210. At step 335 the data packet 100 is received and the adaptive equalizer 225 at the second station 210 adaptively equalizes the signal to correct for multipath distortion; however the adaptive equalizer 225 must act without the aid of any CSI segment 125. The adaptive equalization results in a post hoc channel estimate of the condition of the channel between the two stations 205, 210, which estimate is then stored at step 340 at the second station 210.

Returning to step 325, if however it is determined that the time stamp on the existing channel status information for the second station 210 is current, then the method 300 continues to step 345 where channel coefficients for a new CSI segment 125 are calculated from the existing channel status information. Next, at step 350 the existing channel status information is used in the pre-equalizer 215 of the first station 205. An interactive equalization data packet 120 including the new CSI segment 125 is then transmitted at step 355 to the second station 210. At step 360 the adaptive equalizer 225 of the second station 210 adaptively equalizes the received signal with the aid of the received CSI segment 125. The output of the adaptive equalizer 225 is then stored in step 340 as a new post hoc channel estimate. Finally, the method 300 repeats itself by returning to step 305.

Figure 4:
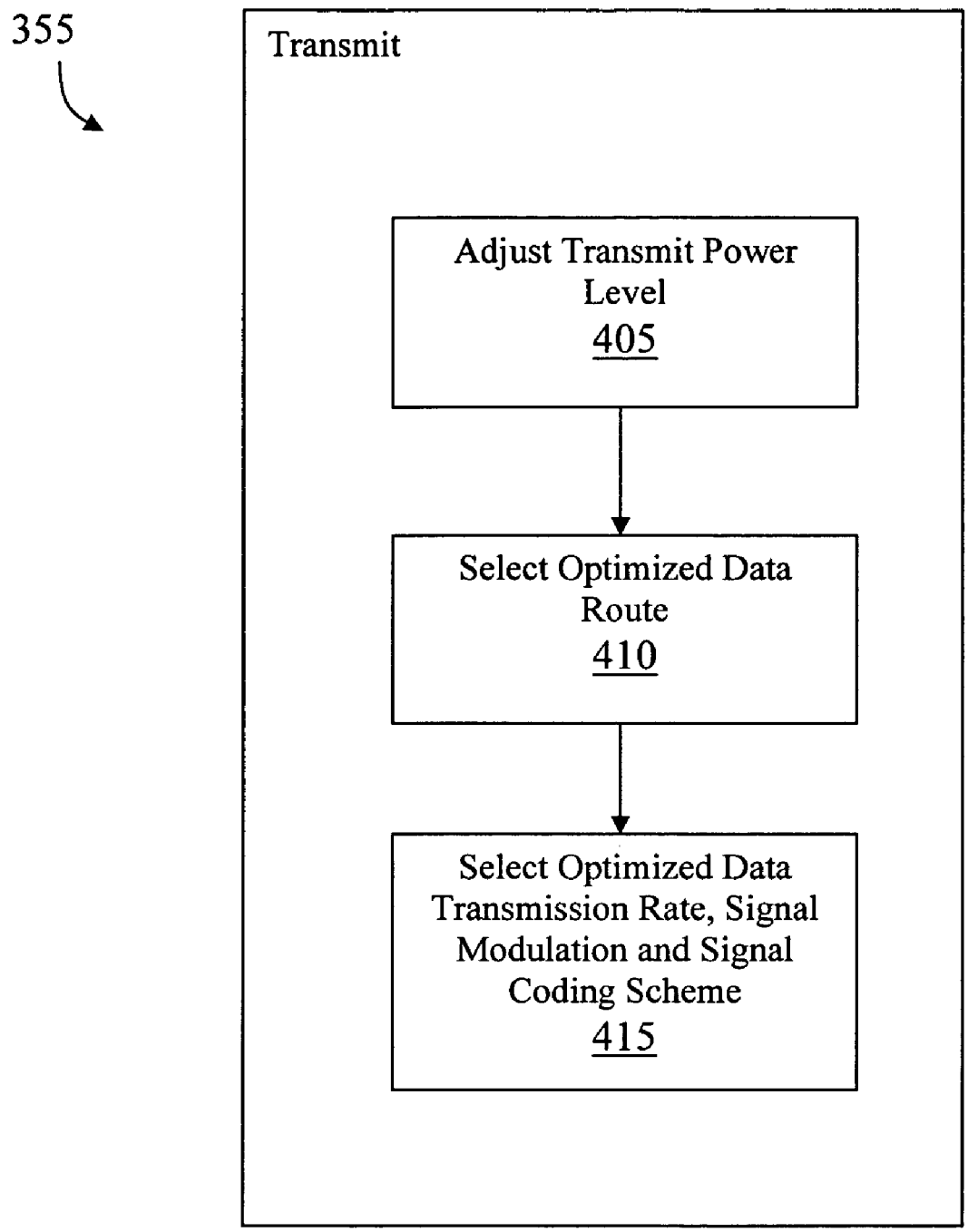
FIG. 4 is a generalized flow diagram illustrating advantages of the present invention concerning optimised data transmission.

Referring to FIG. 4, there is another generalized flow diagram that illustrates other advantages of the present invention concerning the transmission step 355 shown in FIG. 3. When an interactive equalization data packet 120 is to be sent from a first station 205 to a second station 210 according to the present invention, the current channel status information that is known by the first station 205 enables several additional improvements to be made in the transmission step 355.

For example, at step 405 the transmission power used by the first station 205 can be adjusted so that the second station 210 will experience a desired signal to noise level. That enables a total network throughput of a BSS, of which the first and second stations 205, 210 form a part, to be increased due to a reduction in co-channel interference.

Further, at step 410 the first station 205 is able to select an optimized route for the transmission because the first station 205 has many more metrics, when compared with the prior art, with which to make decisions.

Also, at step 415 the first station 205 is able to select an optimized data transmission rate, signal modulation method and signal-coding scheme by using the current channel status information. The optimization of these variables also makes a BSS more robust and efficient.

Those skilled in the art will appreciate that the present invention is not limited to communications between only two stations 205, 210 in a BSS, but is applicable to any number of stations in a BSS. Thus a first station 205 in a BSS may store channel status information concerning numerous other stations. In such a case the method 300 is repeated every time data is sent between any two stations in the BSS.

Similarly, the method 300 can be applied to multicasting applications where a single station 205 transmits data simultaneously to numerous other stations. Here, the pre-equalizer 215 at the transmitting station 205 pre-equalizes a signal using the stored channel status information concerning numerous receivers—thus conditioning the signal in a manner that is most suitable for all receiving stations in the multicast network. Similarly, "group" channel status information can be calculated by determining what, if any, are common CSI coefficients for all stations in a group.

In summary the present invention is a system and method for interactive equalization of transmission signals, where the equalization can be adjusted to varying channel conditions in real-time as encountered in real-world wireless systems. The interactive equalization uses a learning algorithm to fine-tune existing channel status information. By using existing channel status information the invention uses fewer iterations, is less computationally expensive, and is less sensitive to errors than the prior art. Also, because up-to-date channel status information is maintained at each transmitter in a network, the transmitters are able to make more informed decisions with regard to various transmission parameters such as power levels, route selection, transmission rates, signal modulation, and signal coding.

The above detailed description provides a preferred exemplary embodiment only, and is not intended to limit the scope, applicability, or configuration of the present invention. Rather, the detailed description of the preferred exemplary embodiment provides those skilled in the art with an enabling description for implementing the preferred exemplary embodiment of the invention. It should be understood that various changes can be made in the function and arrangement of elements and steps without departing from the spirit and scope of the invention as set forth in the appended claims.

We claim:

1. A method of pre-equalizing radio communication signals comprising the steps of:
including first channel status information in a segment of a first data packet;
transmitting the first data packet from a first station over a radio communication channel as a first signal, the first signal being pre-equalized at the first station using the first channel status information;

receiving the first signal at a second station, the first signal being adaptively equalized using the first channel status information to create a first post hoc status estimate of the channel;

including second channel status information in a segment of a second data packet, the second channel status information being calculated from the first post hoc status estimate of the channel; and transmitting over the channel the second data packet from the second station as a second signal, the second signal being pre-equalized at the second station using the second channel status information.

2. The method of claim 1, further comprising the steps of: including a time stamp in the first channel status information; and determining whether the time stamp has expired before the first signal is pre-equalized at the first station.

3. The method of claim 1, further comprising the steps of: receiving the second signal at a second signal receiving station, wherein the second signal is adaptively equalized to create a second post hoc status estimate of the channel and a corresponding time stamp;

determining that the time stamp of the second post hoc status estimate of the channel has expired; and transmitting over the channel a third data packet from the second signal receiving station as a third signal, wherein the third signal is not pre-equalized using the second post hoc status estimate.

4. The method according to claim 3, wherein the third data packet does not include a channel status information segment.

5. The method according to claim 3, wherein the first station and the second signal receiving stations are the same station.

6. The method according to claim 1, wherein the data packets comprise voice data.

7. The method according to claim 1, further comprising the step of adjusting a transmit power level before transmitting the second data packet, wherein the transmit power is adjusted to provide a desired signal to noise ratio at a destination.

8. The method according to claim 1, wherein a particular data transmission route is selected by consideration of the second channel status information.

9. The method according to claim 1, wherein the first and second stations are part of a basic service set of a WLAN, and wherein the first and second stations store time-stamped channel status information concerning other stations in the basic service set.

10. The method according to claim 1, wherein the first and second stations are integrated into wireless devices selected from the group consisting of mobile telephones, personal digital assistants, laptop computers, desktop computers, printers, and computer peripheral devices.

11. The method according to claim 1, wherein the first post hoc status estimate of the channel is created by updating the first channel status information.

12. The method according to claim 1, wherein the second channel status information is used as a channel assessment metric for determining a suitable data signal transmission rate, signal modulation, or data signal coding scheme based on a current condition of the channel.

13. The method according to claim 1, wherein the first data packet includes a header where a bit in the header is used to flag a presence of the first channel status information.

14. A system for pre-equalizing radio communication signals comprising:

a first station adapted to transmit a first data packet including a channel status information segment over a radio communication channel as a first signal; and a second station comprising a static pre-equalizer and an adaptive equalizer, the second station adapted to receive the first signal and adaptively equalize the first signal using the adaptive equalizer and the channel status information to create a post hoc status estimate of the channel;

wherein the second station is further adapted to transmit a second data packet over the channel as a second signal, the second signal being pre-equalized by the pre-equalizer using the post hoc status estimate of the channel.

15. The system of claim 14 wherein the first data packet and the second data packet each include a time stamp.

16. The system of claim 15 wherein the first station further comprises a computer readable medium having a computer readable program code device configured to read the time stamp and determine whether to include the channel status information in the data packets depending on whether the time stamps have expired.

17. The system of claim 14 wherein the first and second stations are part of a basic service set of a WLAN, and wherein the first and second stations store time-stamped channel status information concerning other stations in the basic service set.

18. The system of claim 14, wherein the first and second stations are integrated into wireless devices selected from the group consisting of mobile telephones, personal digital assistants, laptop computers, desktop computers, printers, and computer peripheral devices.

19. The system of claim 14, wherein the channel status information is used as a channel assessment metric for determining a suitable data signal transmission rate, signal modulation, or data signal coding scheme based on a current condition of the channel.

20. The system of claim 14, wherein a transmit power level is adjusted before transmitting the second data packet so as to provide a desired signal to noise ratio at a destination.

21. The system of claim 14, wherein a particular data transmission route is selected by consideration of the post hoc status estimate of the channel.

22. The system of claim 14, wherein the first data packet includes a header where a bit in the header is used to flag a presence of the first channel status information segment.

* * * * *